United States Patent [19]
Wills

[11] Patent Number: 4,634,877
[45] Date of Patent: Jan. 6, 1987

[54] OPTICAL TRANSMITTER RECEIVER SWITCH

[75] Inventor: Harry D. Wills, Mentor, Ohio

[73] Assignee: General Electric Company, San Jose, Calif.

[21] Appl. No.: 743,007

[22] Filed: Jun. 10, 1985

[51] Int. Cl.$^4$ .............................................. G02B 27/00
[52] U.S. Cl. ...................................... 250/551; 455/602
[58] Field of Search ................. 250/551; 455/602, 610, 455/612; 307/311

[56] References Cited

U.S. PATENT DOCUMENTS

| | | | |
|---|---|---|---|
| Re. 31,255 | 5/1983 | Ceddes | 350/96.11 |
| 3,297,875 | 1/1967 | Garwin et al. | 455/612 |
| 3,996,526 | 12/1976 | d'Auria et al. | 372/31 |
| 4,245,884 | 1/1981 | Magura et al. | 350/96.16 |
| 4,262,366 | 4/1981 | Eumarian | 455/612 |
| 4,281,253 | 7/1981 | Culver | 250/551 |
| 4,310,217 | 1/1982 | de Mendez et al. | 350/96.16 |
| 4,310,754 | 1/1982 | Check, Jr. | 455/602 |
| 4,317,232 | 2/1982 | Pickett, et al. | 455/606 |
| 4,378,143 | 3/1983 | Winzer | 350/96.16 |
| 4,383,731 | 5/1983 | Simon, et al. | 350/96.18 |
| 4,422,181 | 12/1983 | Grafton et al. | 455/606 |
| 4,449,244 | 5/1984 | Kopainsky | 455/602 |

Primary Examiner—David C. Nelms
Assistant Examiner—Crystal D. Cooper
Attorney, Agent, or Firm—Ivor J. James, Jr.; Raymond G. Simkins

[57] ABSTRACT

An optical transmitter receiver switch incorporating a fiber optic light guide for communicating between electrically isolated circuits. Each switch has a photoemitter and a photosensor in optical communication with each other and with one end of the light guide. The photosensor and photoemitter are enclosed in an opaque housing and communicate with each other and the light guide via a transparent optical cavity. There results an unusually versatile optical isolator which, when in optical communication with a second optical transmitter receiver switch, forms the preferred relay.

11 Claims, 2 Drawing Figures

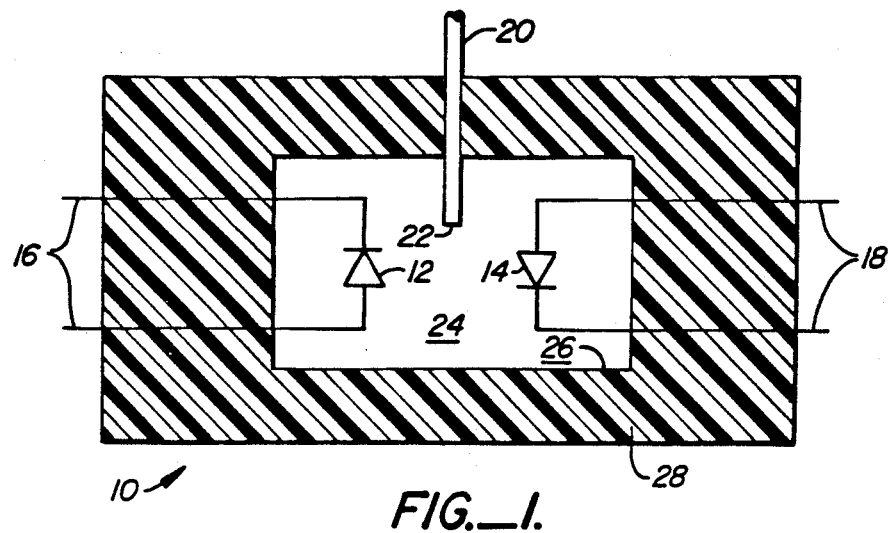
FIG._1.
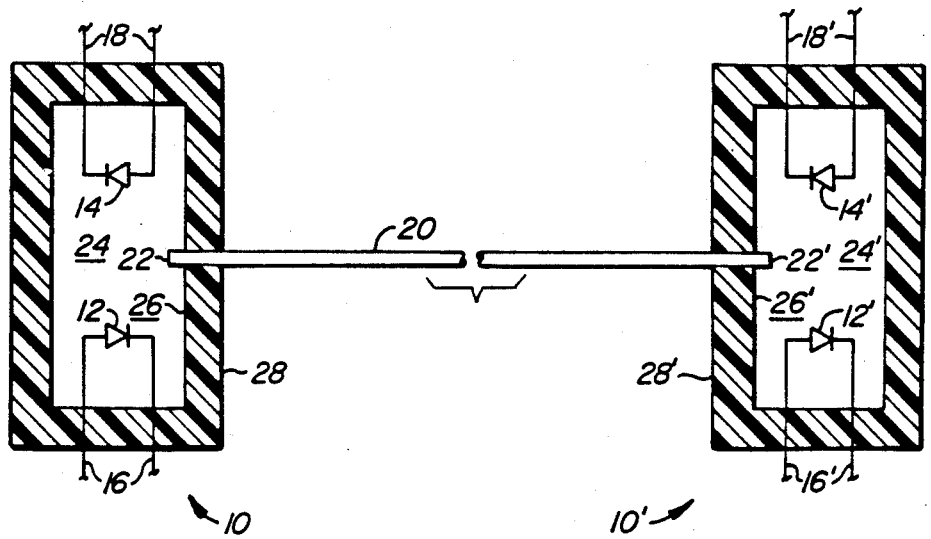
FIG._2.

OPTICAL TRANSMITTER RECEIVER SWITCH

BACKGROUND OF THE INVENTION

1. Field of the Invention

This invention is directed to devices for communicating between electrically isolated circuits using light signal transmission and fiber optic light guides.

2. Description of the Prior Art

Optical isolators for optically coupling electronically isolated circuits are known. Series C46 and C47 relays manufactured by Teledyne, Hawthorne, Calif. are one example. Typically, such relay devices enclose a light emitting diode (LED) and a photodiode in a standard DIP package, embedding the two diodes within the package in a manner to effect optical coupling. While such devices serve to optically isolate two electronic circuits and are compact, they are suited only for electrical isolation of circuits that can be mounted in close physical proximity. They are also unsuited for applications in which it is desirable to relay a signal simultaneously to two or more electrically isolated circuits.

Transmitters and receivers of optical signals for conversion to electrical signals using fiber optic light guides are also known. Light transmitted through a fiber optic light guide is typically characterized by relatively low dispersion upon leaving the end of the light guide. Conversely, a light guide will transmit only light directed toward its end from a relatively small angular area. Prior art devices for communicating between fiber optics and semiconductor diodes have frequently focused primarily on means for aligning a light source or receiver with a fiber optic light guide. For example, Simon, et al., U.S. Pat. No. 4,383,731, discloses a coupling between a semiconductor diode and a fiber optic light guide. Grafton, et al., U.S. Pat. No. 4,422,181, describes a bidirectional fiber optic coupler for communicating between semiconductor diodes.

Still other prior art devices are capable of both transmitting and receiving light through a fiber optic light guide to a single semiconductor device. For example, Geddes, Reissue No. 31,255, describes a fiber optic light guide simultaneously interfaced with both a light emitting region and a light detecting region of the same semiconductor device. Such devices can be used for bidirectional optical communication between circuits separated by widely varying distances but can operate in only one direction at any given time. These semiconductor devices operate to either detect or transmit light at any given time, but not both, and are incapable of optical communication between the photodetecting and photoemitting regions of the same semiconductor device. Further, the photodetecting and photoemitting components are in electrical communication at all times. Finally, such devices are not readily adaptable from one optically communicating and electrically isolating function to another.

BRIEF SUMMARY OF THE INVENTION

An optical transmitter receiver switch incorporating a fiber optic light guide for communicating between electrically isolated circuits is disclosed. Each switch has a photoemitting transducer and a photodetecting transducer in optical communication with each other and with one end of a light guide. The photoemitting transducer and the photodetecting transducer are enclosed in an opaque housing and communicate with each other and the light guide via a transparent optical coupler. A light guide pierces the housing for remote optical sensing and optical communication. There results an unusually versatile optical isolater which, when in optical communication with a second optical transmitter receiver switch, forms the preferred relay.

A single such switch can be used as an optical signal transmitter, and optical signal receiver, or as a relay for communication between electrically isolated circuits. These functions can also be used simultaneously so that the switch may operate as an optical signal transmitter to transmit to a third electrically isolated circuit or allow external monitoring of the state of the switch, or as an optical receiver that is capable of receiving and detecting either an electrical signal or an optical signal.

The preferred relay can be used for each of the applications described above for the optical transmitter receiver switch. In addition, four mutually electrically isolated circuits may be employed to communicate signals over the length of the light guide. The preferred relay can also be operated as a digital electronic "OR" gate with two physically separate, electronically independent outputs. With appropriate filtering circuitry the preferred relay can be utilized to simultaneously transmit different, electrically encoded signals over the light guide. Other applications of the present invention will be apparent to those skilled in the art.

As used in this specification and the appended claims, "light", "light signal" and "optical signal" are used interchangeably and may denote but are not limited to ultraviolet, visible, and infrared light. In a particular application the wave length chosen will be consonant with the properties of the materials used in a particular embodiment of the invention. For example, where the invention is utilized to provide remote sensing of the state of a switch or relay by a human operator, it may be convenient to choose the transducers and light guide to emit and use visible light. Applications in which remote sensing is accomplished by electrically isolated circuitry, however, may use visible or other light as convenient and compatible with the characteristics of the components used. In this specification, "photosensitive" and "photodetecting" are used synonymously. A "photodetecting transducer" is a device capable of producing an electrically detectable signal in response to incident light; "photoemitting transducer" denotes a device for conversion of electrical signals to light.

The primary object of the invention is to provide a versatile and compact means for communicating between electrically isolated circuits separated by distances varying from a fraction of an inch to several inches or feet using optical signal transmission.

A further object of this invention is to provide optical coupling between a fiber optic light guide and semiconductor devices so that the relative alignment of the fiber optic and the semiconductors in any application is not critical.

Another object of the invention is to provide a device which can simultaneously optically communicate to two or more electrically isolated circuits.

Yet another object of the invention is to provide a relay between electrically isolated circuits in which the state of the relay can be monitored from a remote point.

BRIEF DESCRIPTION OF THE DRAWINGS

FIG. 1 is a schematic view of an optical transmitter receiver switch embodying this invention.

FIG. 2 is a schematic view of the preferred relay of this invention.

DETAILED DESCRIPTION OF THE INVENTION

The optical transmitter receiver switch embodying the invention, designated generally as 10, is shown schematically in FIG. 1. In switch 10, photoemitting transducer 12 and photodetecting transducer 14 are optically coupled with each other and with one end 22 of light guide 20. Typically, photoemitting transducer 12 is a light emitting semiconductor diode, for example a gallium arsenide diode, and could be a laser diode. Photosensitive transducer 14 may be a second semiconductor diode, such as a PIN diode or silicon avalanche photodiode, chosen for optimal photoelectric conversion efficiency of the light emitted by photoemitting transducer 12.

The electrical circuitry for operating and using these transducers is connected to the photoemitting transducer 12 and the photodetecting transducer 14 via input circuit leads 16 and output circuit leads 18, respectively. Various suitable circuit arrangements are well known or will be apparent to those ordinarily skilled in the art. In all such arrangements, to utilize the present invention to its fullest, the circuitry for operating photoemitting transducer 12 and the circuitry for operating photodetecting transducer 14 will be mutually electrically isolated to prevent electrical interference or crosstalk between the input and output circuitry.

Photoemitting transducer 12 and photodetecting transducer 14 are optically coupled with light guide 20; light guide 20 is thus capable of transmitting light from the photoemitting transducer 12 to a remote sensing point (not shown) or of transmitting light to photodetecting transducer 14 from a remotely located light source (not shown). Light guide 20 is conveniently a fiber optic light guide or "light pipe" and may be as long as required for a particular application.

Photoemitting transducer 12, photodetecting transducer 14, and one end 22 of light guide 20 are in optical communication with each other via optical coupler 24. In the preferred embodiment of the invention, optical coupler 24 is a relatively soft transparent plastic material in which photoemitting transducer 12, photodetecting transducer 14, and the end 22 of light guide 20 are embedded. While other transparent materials will be apparent as suitable, a soft plastic facilitates the attachment of the light guide 20 in optical contact with optical coupler 24. This plastic also serves to cushion the components from vibration. Optical coupler 24 transmits and disperses the light emitted by either photoemitting transducer 12 or end 22 of light guide 20 so that it may be received by either end 22 of light guide 20 or photodetecting transducer 14. Optical coupler 24 is preferably coated on its outer surface 26 with an internally reflective and dispersive coating, such as paint containing $TiO_2$ or ZnO particulate. The geometries, locations and orientations of photoemitting transducer 12, photodetecting transducer 14 and end 22 of light guide 20 within optical coupler 24 are thereby not critical and the construction or manufacture of devices embodying the present invention is thus simplified.

Photoemitting transducer 12, photodetecting transducer 14, and optical coupler 24 are enclosed in a rigid protective opaque housing 28, which is pierced by input circuit leads 16, output circuit leads 18, and light guide 20. Such housings and means for encasing electronic components therein are well known. Housing 28 serves to protect optical coupler 24 and prevents the introduction of stray light into optically active portions of the switch. For the greatest convenience and versatility, housing 28 and input and output circuit leads 16 and 18 are configured so that the resulting device embodying the present invention is compatible with standard electrical circuit boards and components.

This embodiment of the invention can be used in a variety of configurations to perform different functions. For example, this device functions as a fiber optic transmitter when photoemitting transducer 12 is excited by an electrical signal input at input leads 16. The light produced by photoemitting transducer 12 is transmitted through light guide 20 for the desired use.

The device functions as a fiber optic receiver when a light signal generated remotely is input via the light guide 20 to photosensitive transducer 14. The received light signal is converted to an electrical signal available at output leads 18.

The device can also be used as a switch; an electrical signal input at leads 16 to photoemitting transducer 12 will excite photosensitive transducer 14 and cause an electrical signal to be output through leads 18. When the device is used as a switch, it also transmits light through light guide 20 when the switch is "on," enabling remote sensing of the state of the switch or remote operation of a second, remote photosensitive transducer.

Similarly, the "switch" could be operable remotely by a signal transmitted through light guide 20 and received by photosensitive transducer 14. This configuration is equivalent to a digital "OR" gate; photosensitive transducer 14 is "on" if either photoemitting transducer 12 is "on" or if light is being received through light guide 20. Other applications of this optical transmitter receiver switch will be readily apparent to those skilled in the art.

The preferred relay embodying the present invention is shown schematically in FIG. 2. For convenient comparison with FIG. 1 and the detailed description of FIG. 1 above, the components of the second embodiment of the invention are numbered according to the analogous components of the switch described above. In the preferred relay, two transmitter receiver switches 10 and 10' are optically coupled to the ends 22 and 22' of light guide 20. Each transmitter receiver switch 10 or 10' comprises a photoemitting transducer 12 or 12' and a photodetecting transducer 14 or 14' optically coupled to light guide end 22 or 22' with an optical coupler 24 or 24'. In this embodiment, the transducer input circuits (not shown), attachable to input leads 16 and 16', and the otput circuits (not shown), attachable to output leads 18 and 18', may each be electrically isolated from each other.

Use of the preferred relay is facilitated if the light guide 20 is fixedly attached to housing 28 and removably attached to housing 28'.

For example, and only by way of illustration, the preferred relay could be used to simultaneously transmit coded signals bidirectionally through light guide 20. Input of differently modulated electrical signals independently via input leads 16 and 16' will result in output of a combination of the input signals at both output lead pairs 18 and 18'. A signal input at leads 16 will be transmitted across optical coupler 24 to output leads 18, while the signal input at leads 16' will be optically coupled to light guide 20 via optical coupler 24' and to output leads 18 via optical coupler 24 and photodetecting transducer 14. Analogously, the output of photodetecting transducer 14' will be a combination of signals input via 16 and 16' to photoemitting transducers 12 and 12'. By appropriate well known filtering circuits connected to leads 18 and 18', the signal input at 16' could be isolated in a circuit connected to output leads 18 and the signal input at leads 16 could be isolated by a circuit connected to leads 18'.

Other embodiments and uses of the present invention will be apparent to one skilled in the art. For example, it may be desirble to couple two or more light guides to the optical coupler of an individual transmitter receiver switch, enabling the state of the photoemitting transducer to be monitored at two or more remote locations or to activate the photosensitive transducer from any one of two or more remote locations, as well as from the photoemitting transducer mounted in the switch assembly.

What is claimed is:

1. An optical transmitter receiver switch comprising:
   a photoemitting transducer having leads for electrically exciting the photoemitting transducer;
   a photodetecting transducer having leads for detecting the light induced electrical response of the photodetecting transducer;
   a fiber optic light guide having a first end;
   an optial coupler simultaneously optically coupling the photoemitting transducer, the photodetecting transducer, and the first end of the light guide; and
   an opaque housing enclosing the optical coupler, the photoemitting transducer, the photodetecting transducer, and the first end of the light guide; wherein
   the photoemitting transducer and the photodetecting transducer are electrically isolated from each other.

2. An optical transmitter receiver switch according to claim 1 wherein the photoemitting transducer comprises a light emitting diode and the photodetecting transducer comprises a photosensitive semiconductor diode.

3. An optical transmitter receiver switch according to claim 1 wherein the optical coupler comprises a body of substantially transparent material embedding the photoemitting transducer, the photodetecting transducer, and the first end of the light guide.

4. An optical transmitter receiver switch according to claim 3 wherein the outer surface of the optical coupler comprises an internally reflective coating.

5. An optical transmitter receiver switch according to claim 4 wherein the internally reflective coating includes a white particulate.

6. An optical transmitter receiver switch according to claim 4 wherein the photoemitting transducer is a laser diode.

7. An optical electronic relay comprising:
   first and second optical transmitter receiver switches, and
   a fiber optic light guide having first and second ends associated respectively with the first and second switches;
   each optical transmitter receiver switch including;
   a photoemitting tranducer having leads for exciting the photoemitting transducer;
   a photodetecting transducer having leads for detecting the light induced electrical response of the photodetecting transducer;
   an optical coupler embedding the photoemitting transducer, the photodetecting transducer, and one end of the light guide in optical communication; and
   an opaque housing enclosing the optical coupler, the photoemitting transducer, the photodetecting transducer, and one end of the light guide;
   wherein each transducer is electrically isolated from the other transducers.

8. An optical electronic relay according to claim 7 wherein each photoemitting transducer comprises a light emitting diode and each photodetecting transducer comprises a photosensitive semiconductor diode.

9. An optical electronic relay according to claim 8 wherein each optical coupler comprises a body of substantially transparent material coated with an internally reflective layer.

10. An optical electronic relay according to claim 9 wherein the first end of the light guide is fixedly mounted in optical contact with the optical coupler of the first optical transmitter receiver switch and the second end of the light guide is removably mounted in optical contact with the optical coupler of the second optical transmitter receiver switch.

11. A optical electronic relay according to claim 9 wherein each internally reflective layer includes white particulate.

* * * * *